(12) United States Patent
Shiota et al.

(10) Patent No.: US 11,475,713 B2
(45) Date of Patent: Oct. 18, 2022

(54) APPARATUS AND METHOD FOR ESTIMATING OWN VEHICLE BEHAVIOR

(71) Applicant: DENSO CORPORATION, Kariya (JP)

(72) Inventors: Kentaro Shiota, Kariya (JP); Naoki Nitanda, Kariya (JP); Kazuma Ishigaki, Kariya (JP); Shinya Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 403 days.

(21) Appl. No.: 16/672,867

(22) Filed: Nov. 4, 2019

(65) Prior Publication Data

US 2020/0143152 A1    May 7, 2020

(30) Foreign Application Priority Data

Nov. 6, 2018  (JP) ............................ JP2018-208879

(51) Int. Cl.
| | | |
|---|---|---|
| *G06K 9/00* | (2022.01) | |
| *G06V 40/20* | (2022.01) | |
| *B60W 40/10* | (2012.01) | |
| *G06V 20/56* | (2022.01) | |

(52) U.S. Cl.
CPC ............ *G06V 40/20* (2022.01); *B60W 40/10* (2013.01); *G06V 20/56* (2022.01); *B60W 2420/42* (2013.01); *B60W 2556/45* (2020.02)

(58) Field of Classification Search
CPC ...... G06V 40/20; G06V 20/56; G06V 20/588; B60W 40/10; B60W 2420/42; B60W 2556/45
See application file for complete search history.

(56) References Cited

U.S. PATENT DOCUMENTS

| | | | |
|---|---|---|---|
| 9,665,100 B2 | 5/2017 | Shashua et al. | |
| 11,067,996 B2* | 7/2021 | Oder | G06V 10/95 |
| 11,145,146 B2* | 10/2021 | Mercep | B60W 50/0205 |
| 2016/0272203 A1* | 9/2016 | Otake | B60W 30/18154 |
| 2016/0305794 A1 | 10/2016 | Horita et al. | |
| 2017/0010616 A1* | 1/2017 | Shashua | G06V 20/588 |
| 2017/0248960 A1 | 8/2017 | Shashua et al. | |
| 2018/0181818 A1 | 6/2018 | Shimotani et al. | |
| 2020/0257301 A1* | 8/2020 | Weiser | G06N 3/02 |
| 2020/0385014 A1* | 12/2020 | Hanniel | G01C 21/3815 |
| 2021/0182596 A1* | 6/2021 | Adams | G06V 10/462 |

FOREIGN PATENT DOCUMENTS

| | | |
|---|---|---|
| JP | 2018-510373 A | 4/2018 |
| WO | WO 2016/130719 A2 | 8/2016 |

OTHER PUBLICATIONS

U.S. Appl. No. 16/557,034; filed Aug. 30, 2019, Kazuma et al.

* cited by examiner

*Primary Examiner* — Dhaval V Patel
(74) *Attorney, Agent, or Firm* — Maschoff Brennan

(57) ABSTRACT

In an apparatus for estimating a behavior of a vehicle carrying the apparatus based on images of surroundings of the vehicle captured by an imaging device, an information acquirer acquires beforehand specific location information that is information representing a specific location in which a situation around the vehicle is such that the estimation of the own vehicle behavior based on the images is unstable. In the apparatus, a behavior estimator estimates the own vehicle behavior based on the images captured by the imaging device and the specific location information.

8 Claims, 5 Drawing Sheets

<IMAGE AT TIME t1>

<IMAGE AT TIME t2>

<IMAGE AT TIME t11>

<IMAGE AT TIME t12>

<IMAGE AT TIME t11>

APPARATUS AND METHOD FOR ESTIMATING OWN VEHICLE BEHAVIOR

CROSS-REFERENCE TO RELATED APPLICATION

This application is based on and claims the benefit of priority from earlier Japanese Patent Application No. 2018-208879 filed Nov. 6, 2018, the description of which is incorporated herein by reference.

BACKGROUND

Technical Field

The present disclosure relates to an apparatus and a method for estimating an own vehicle behavior.

Related Art

A system is known that records position information such as landmarks using an image captured by a camera mounted to a vehicle, uploads the information to a server or the like to generate a sparse map, and downloads the generated sparse map to determine a position of the own vehicle when the vehicle is traveling.

DESCRIPTION OF SPECIFIC EMBODIMENT

In the system set forth above, as described in Japanese Translation of PCT International Application Publication No. JP-T-2018-510373, when generating data to be uploaded to the server, that is, probe data on the vehicle side, a Structure From Motion method is used. Hereinafter, Structure From Motion is abbreviated as SFM. A technique for estimating an own vehicle behavior with high accuracy using an optical flow such as SFM is an important technique indispensable for map generation and localization. The optical flow is a vector representing a motion of an object in an image between two times and is used to find a movement of feature points from continuously captured images.

However, the estimation of ego-motion in the optical flow may be unstable depending on the surrounding environment of the vehicle. Note that the ego-motion is a parameter that represents an attitude of a camera mounted to the vehicle, and thus an attitude of the vehicle per se. For example, on a highway or the like, when the vehicle is traveling in a section where soundproof walls of the same shape are continuously provided, depending on the movement amount of the own vehicle and the repetition interval of the pattern formed by the soundproof walls, there is a possibility that aliasing will occur, and the estimation of ego-motion in the optical flow and thus the estimation of the own vehicle behavior will be impossible. Note that aliasing means that, for example, an erroneous result is obtained that an object is stopped even though the object is actually in motion.

In view of the above, it is desired to have own vehicle behavior estimation techniques, by which an own vehicle behavior can be estimated accurately even in a location where the estimation of ego-motion in an image becomes unstable.

Hereinafter, a plurality of embodiments will be described with reference to the drawings. In each embodiment, substantially the same components are denoted by the same reference signs and description thereof is omitted.

First Embodiment

Hereinafter, the first embodiment will be described with reference to FIGS. 1-5.

Figure 1:
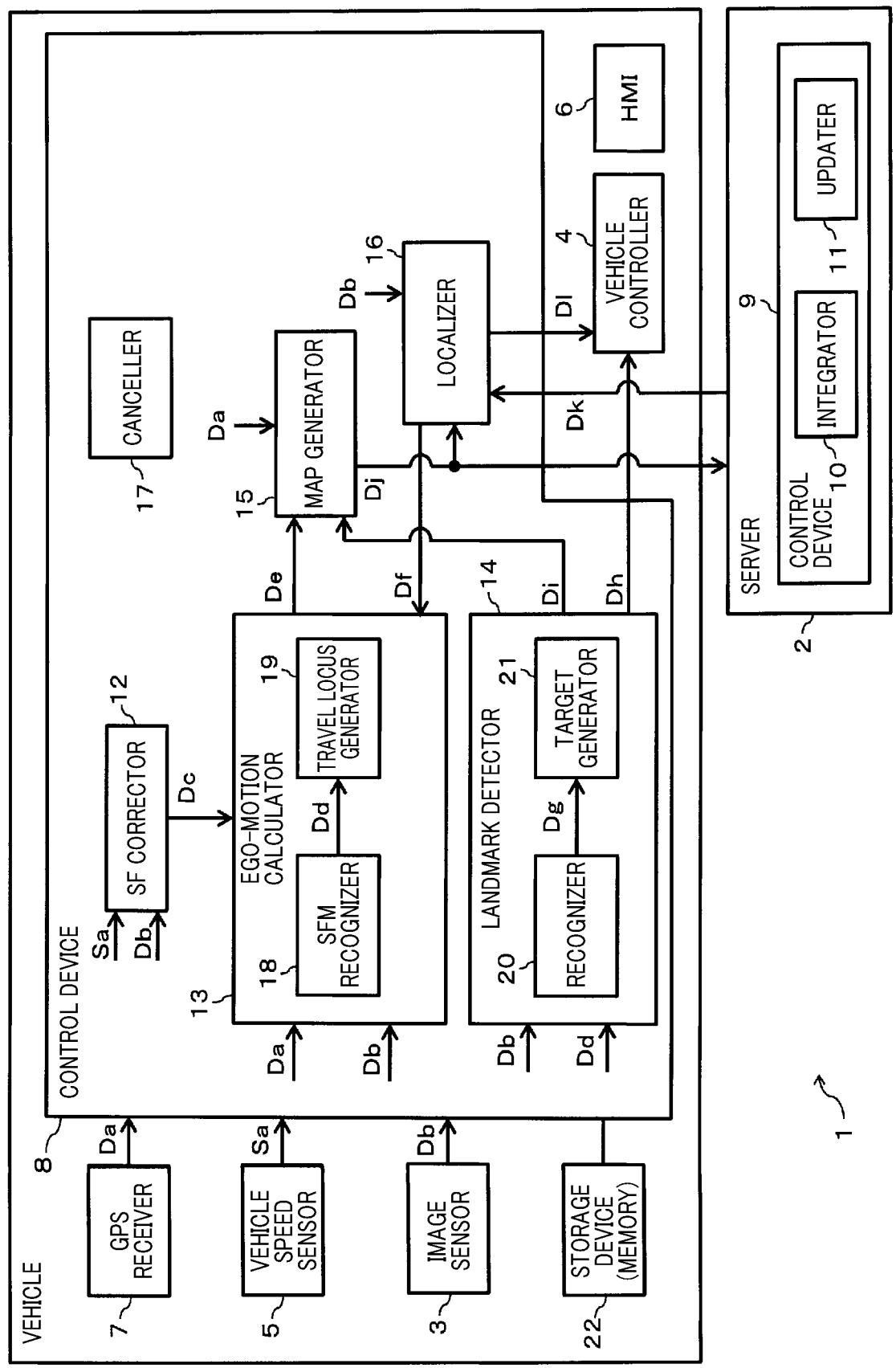
FIG. 1 is a diagram schematically illustrating a configuration of a map system according to a first embodiment.

A map system 1 illustrated in FIG. 1 is a map system for autonomous navigation. The map system 1 additionally functions with respect to a conventional function for specifying a position of an own vehicle, such as GPS, and is effective in identifying the position with higher accuracy. The map system 1 is roughly divided into two functions of map utilization and map update.

In the map utilization, map information stored in a server 2 is downloaded to a vehicle, and the vehicle identifies a position of the own vehicle based on the downloaded map information and positions of landmarks such as signs included in an image captured by an image sensor 3 such as a camera. Hereinafter, the map information stored in the server 2 is also referred to as an integrated map. In this case, driving support is achieved by, a vehicle controller 4 outputting a corresponding command to an actuator that is for operating hardware mounted to the vehicle, based on the identified current position of the own vehicle. The actuator is a device for controlling the vehicle by hardware, such as a brake, a throttle, a steering wheel, and a lamp.

On the other hand, in the map update, information acquired by various sensors such as the image sensor 3, a vehicle speed sensor 5, and a millimeter wave sensor (not illustrated) mounted to the vehicle is uploaded to the server 2 as probe data, and the integrated map in the server 2 is sequentially updated. Thus, for example, driving support and automatic steering are achieved while the position of the vehicle is always identified with high accuracy based on the latest map information.

In the map system 1, a human machine interface 6 is a user interface for notifying a user of various types of information and for transmitting a predetermined operation to the vehicle by the user. In the following description and FIG. 1 and the like, the human machine interface is abbreviated as an HMI. The HMI 6 includes, for example, a display attached to a car navigation device, a display built in an instrument panel, a head-up display projected on a windshield, a microphone, a speaker, and the like. Furthermore, a mobile terminal such as a smartphone that is communicably connected to the vehicle can also be the HMI 6 in the map system 1.

In addition to visually acquiring information displayed on the HMI 6, the user can acquire information by voice, warning sound, and vibration. In addition, the user can request a desired operation from the vehicle by a touch operation on the display or by voice. For example, when the user intends to receive an advanced driving support service such as automatic steering using map information, the user activates the aforementioned function via the HMI 6. For example, when a "map link" button indicated on the display is tapped, a map utilization function is activated and download of map information is started.

In another example, the map utilization function is enabled by giving a command by voice. In addition, upload of map information related to the map update may be performed at all times while the communication between the vehicle and the server 2 is established, may be executed while the map utilization function is enabled by tapping the "map link" button, or may be enabled by an another UI that reflects the user's intention.

The map system 1 of the present embodiment includes the server 2, the image sensor 3, a vehicle controller 4, the vehicle speed sensor 5, the HMI 6, a GPS receiver 7, a control device 8, and the like. The server 2 is provided at a location isolated from the vehicle on which the image sensor 3 and the like are mounted. The server 2 includes a control device 9. The control device 9 is mainly composed of a microcomputer having a central processing unit (CPU), a read-only memory (ROM), a random-access memory (RAM), an input/output (I/O) interface, and the like, and includes an integrator 10 and an updater 11. Each of these functional blocks is implemented by the CPU of the control device 9 executing a computer program stored in a non-transitional tangible storage medium, thereby executing a process corresponding to the computer program. That is, each of these functional blocks is implemented by software. The integrator 10 and the updater 11 are for executing various processes related to the map update described above, and details thereof will be described later.

The GPS receiver 7 outputs data Da representing GPS information represented by a signal received via a GPS antenna (not illustrated) to the control device 8 or the like. The vehicle speed sensor 5 detects a vehicle speed that is a speed of the vehicle, and is configured as a wheel speed sensor that detects a speed of the wheels of the vehicle. The vehicle speed sensor 5 outputs a signal Sa representing the detected speed, which is the detected value, to the control device 8 or the like.

The image sensor 3 is an imaging device that is mounted to a vehicle and captures an image of an environment around the vehicle, specifically, a predetermined range of environment in a forward travel direction of the vehicle. In addition, the image sensor 3 is not limited to the one that captures an image of the forward travel direction of the vehicle, and may be one that captures an image of the rear and the side, for example. Information on the environment around the vehicle captured by the image sensor 3 is stored in a memory (not illustrated) in a form of a still image or a moving image (hereinafter collectively referred to as an image). The control device 8 is configured to be able to read data Db stored in the memory, and executes various processes based on the data Db.

The control device 8 is mainly composed of a microcomputer having a CPU, a ROM, a RAM, an input/output (I/O) interface, and the like. The control device 8 includes functional blocks such as a scale factor corrector 12, an ego-motion calculator 13, a landmark detector 14, a map generator 15, a localizer 16, and a canceller 17. Each of these functional blocks is implemented by the CPU of the control device 8 reading and executing a computer program stored in a storage device 22 that is a non-transitional tangible storage medium, thereby executing a process corresponding to the computer program. That is, each of these functional blocks is implemented by software. In addition, the storage device 22 is a memory, for example, and is mounted to the vehicle together with the image sensor 3, the control device 8, and the like.

The control device 8 corresponds to a computing device and functions as an apparatus for estimating an own vehicle behavior that is a behavior of a vehicle based on an image captured by the image sensor 3. Therefore, the computer program executed by the microcomputer of the control device 8 includes an own vehicle behavior estimation program for estimating an own vehicle behavior that is a behavior of the vehicle based on the image captured by the image sensor 3.

The scale factor corrector 12 learns a scale factor of the vehicle speed sensor 5 based on the signal Sa supplied from the vehicle speed sensor 5 and the data Db representing the image captured by the image sensor 3. In the following description and FIG. 1 and the like, the scale factor corrector is abbreviated as an SF corrector. The scale factor of the vehicle speed sensor 5 is a ratio of a detected value of the vehicle speed sensor 5 to a vehicle speed to be measured by the vehicle speed sensor 5, that is, a ratio of an output change to an input change of the vehicle speed sensor 5, and is a coefficient for obtaining a true value of the vehicle speed from the detected value of the vehicle speed sensor 5. The SF corrector 12 detects the vehicle speed of the own vehicle based on the signal Sa supplied from the vehicle speed sensor 5 and the scale factor corrected by learning, and outputs data Dc representing the detected value to the ego-motion calculator 13.

The ego-motion calculator 13 estimates an own vehicle behavior that is a behavior of a vehicle based on an image captured by the image sensor 3, and corresponds to the behavior estimator. In addition, each process executed by the ego-motion calculator 13 corresponds to the behavior estimation procedure. In this case, the ego-motion calculator 13 is configured to estimate the own vehicle behavior using the SFM method. The ego-motion calculator 13 includes an SFM recognizer 18 and a travel locus generator 19 configured by an SFM module.

Based on the data Db, the SFM recognizer 18 performs estimation of ego-motion which is a parameter representing the own vehicle behavior, that is, an attitude of the vehicle per se, and estimation of a distance to a feature point to be described later. Note that the ego-motion includes information indicating yaw, roll, pitch, and translation. In the above configuration, the image sensor 3 captures a surrounding image of the vehicle while moving as the vehicle travels. The SFM recognizer 18 extracts feature points that can be easily dealt with, such as corners and edges, in an image of two viewpoints captured while the image sensor 3 moves, that is, an image for two frames with different imaging positions captured by one image sensor 3 at different timings.

Figure 2:
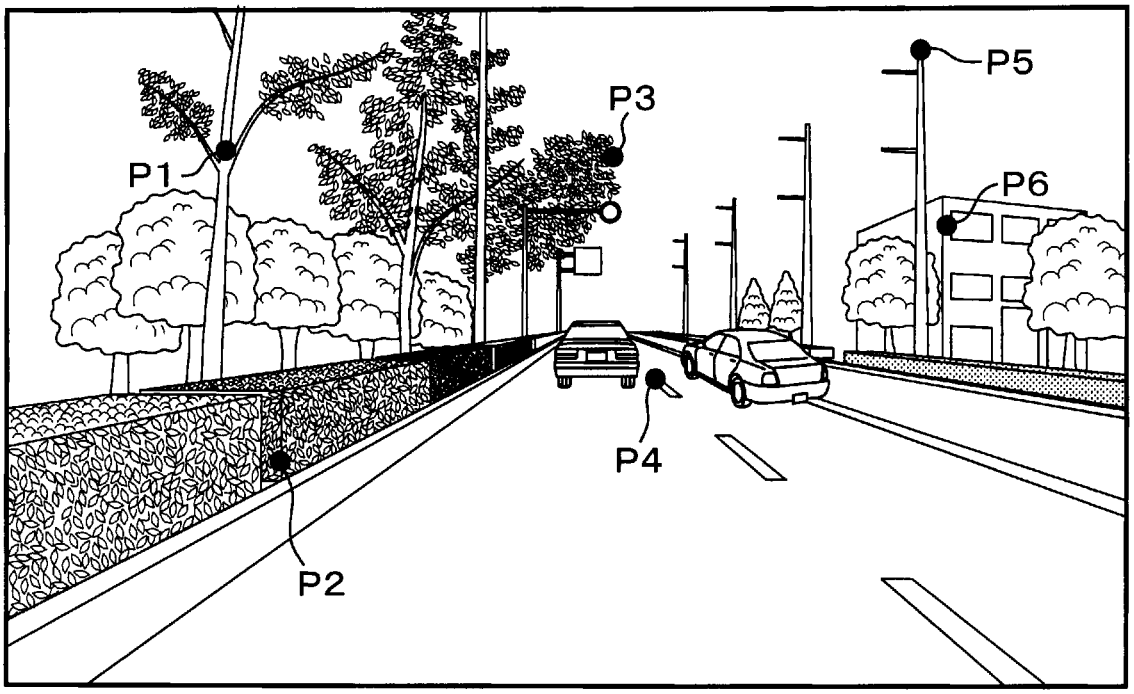
FIG. 2 is a diagram for explaining a process by an SFM recognizer according to the first embodiment, and schematically illustrates an image captured at a predetermined time t1.
Figure 3:
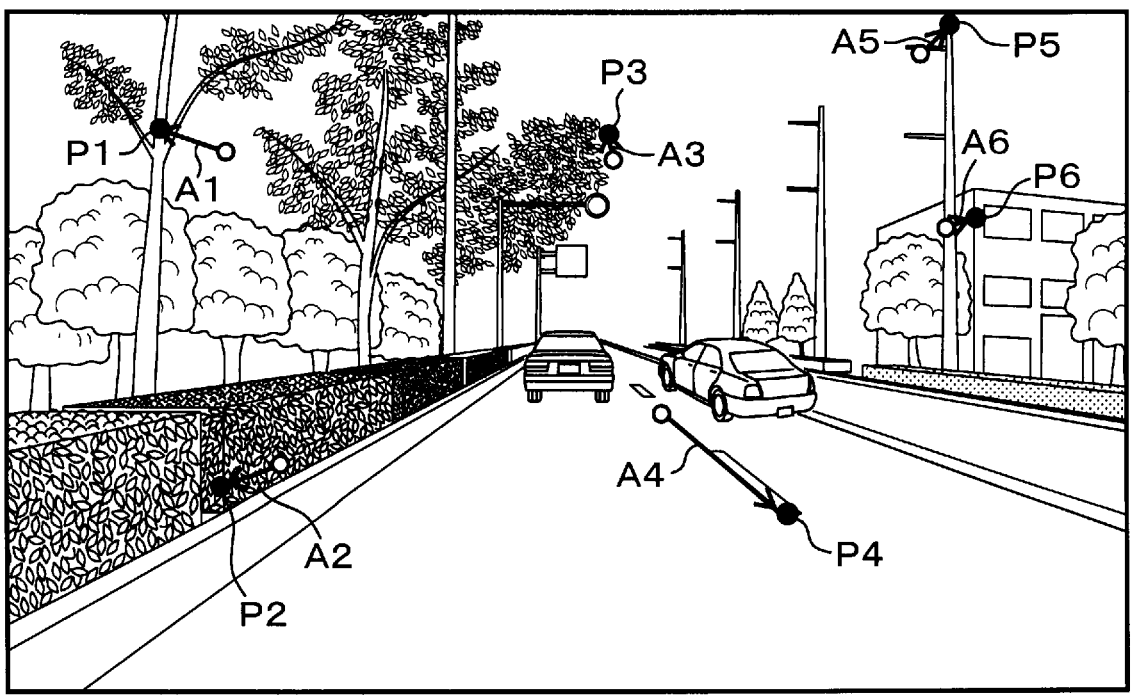
FIG. 3 is a diagram for explaining the process by the SFM recognizer according to the first embodiment, and schematically illustrates an image captured at a predetermined time t2.

The SFM recognizer 18 associates the feature points extracted in the images for two frames, and calculates an optical flow of the feature points based on their positional relationship. For example, as illustrated in FIGS. 2 and 3, feature points P1 to P6 in an image captured at a predetermined time t1, and feature points P1 to P6 in an image captured at a predetermined time t2, which is an image one frame after that image, are associated with each other, and optical flows A1 to A6 in which motions of the feature points P1 to P6 are represented by vectors are calculated. In FIG. 2, each feature point at time t1 is represented by a circle mark. In addition, in FIG. 3, each feature point at time t2 is represented by a circle mark, and the position of each feature point at time t1 is represented by a white circle mark.

The SFM recognizer 18 estimates a three-dimensional position of each feature point and a posture of the image sensor 3, that is, ego-motion, using the plurality of optical flows calculated in this way. In addition, the SFM recognizer 18 can know a movement amount of the own vehicle by such a method; however, there is a problem with the accuracy of the scale. Accordingly, the SFM recognizer 18 acquires a moving speed of the own vehicle based on the data Da representing the GPS information and the data Dc representing the detected value of the vehicle speed, and improves the accuracy of the scale based on the moving speed.

The SFM recognizer 18 outputs data Dd representing the estimated ego-motion to the travel locus generator 19 and the landmark detector 14. The travel locus generator 19 integrates the ego-motion estimated by the SFM recognizer 18 every hour, and generates a travel locus representing how the own vehicle has moved. The travel locus generator 19 outputs data De representing the generated travel locus to the map generator 15.

In the ego-motion calculator 13 configured as described above, if aliasing occurs, there is a risk that the estimated own vehicle behavior and the distance between each feature point may be different from the actuals. The aliasing referred to here is caused by an optical flow due to an incorrect correspondence, that is, an optical flow calculated in a state where there is an error in the feature point correspondence. In other words, in a location where there is an object having an appearance in which a same pattern is repeated along the travel direction of the vehicle, such as a soundproof wall or a tunnel, there may be a case where incorrect correspondence continues to occur in, a location where the same pattern is repeated, that is, a repeated pattern. The above-described location corresponds to a specific location where a situation around the vehicle is such that the estimation of the own vehicle behavior based on the ego-motion calculator 13 becomes unstable.

The SFM optimizes an entire system, and thus if there is a small number of occurrences of such incorrect correspondence, there is no significant impact on the estimation of ego-motion; however, if the number of occurrences of erroneous correspondence increases, there is a risk that the estimation of ego-motion will fail. Hereinafter, a mechanism of such aliasing will be described with reference to FIGS. 4 and 5. In the following description, an interval between repeated patterns is also referred to as a grid.

Figure 4:
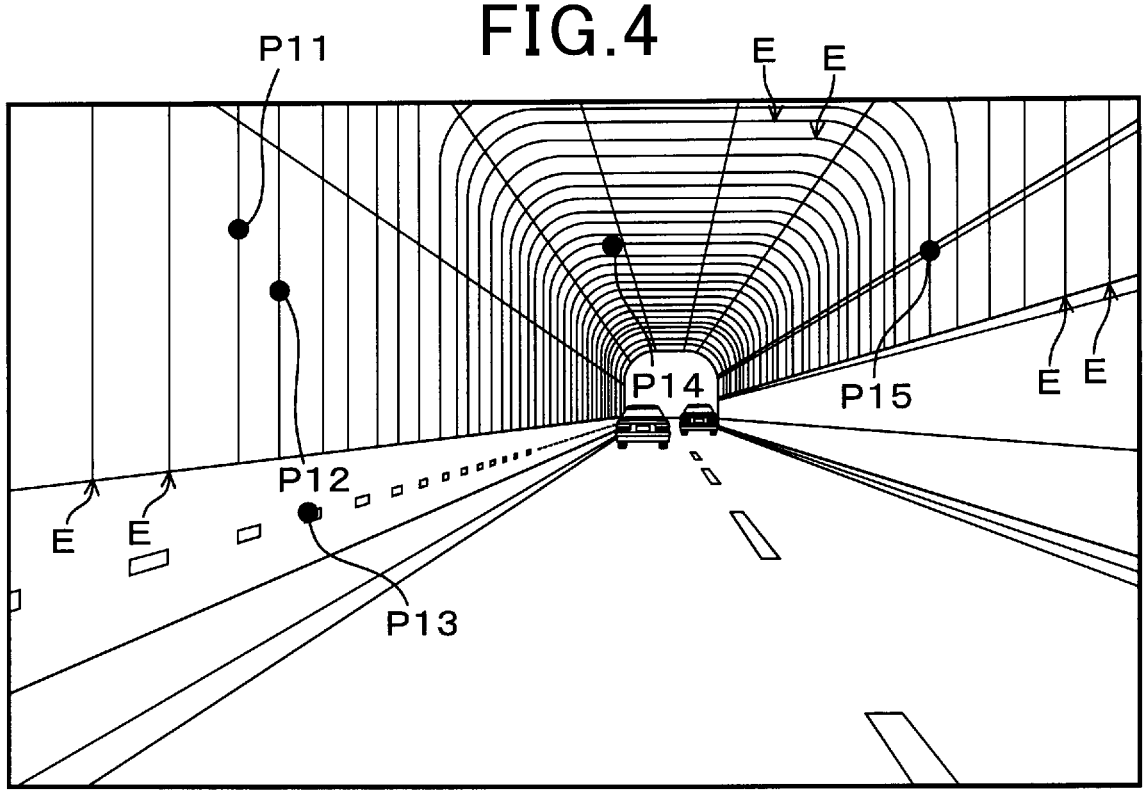
FIG. 4 is a diagram for explaining a mechanism of aliasing occurrence according to the first embodiment, and schematically illustrates an image captured at a predetermined time t11.
Figure 5:
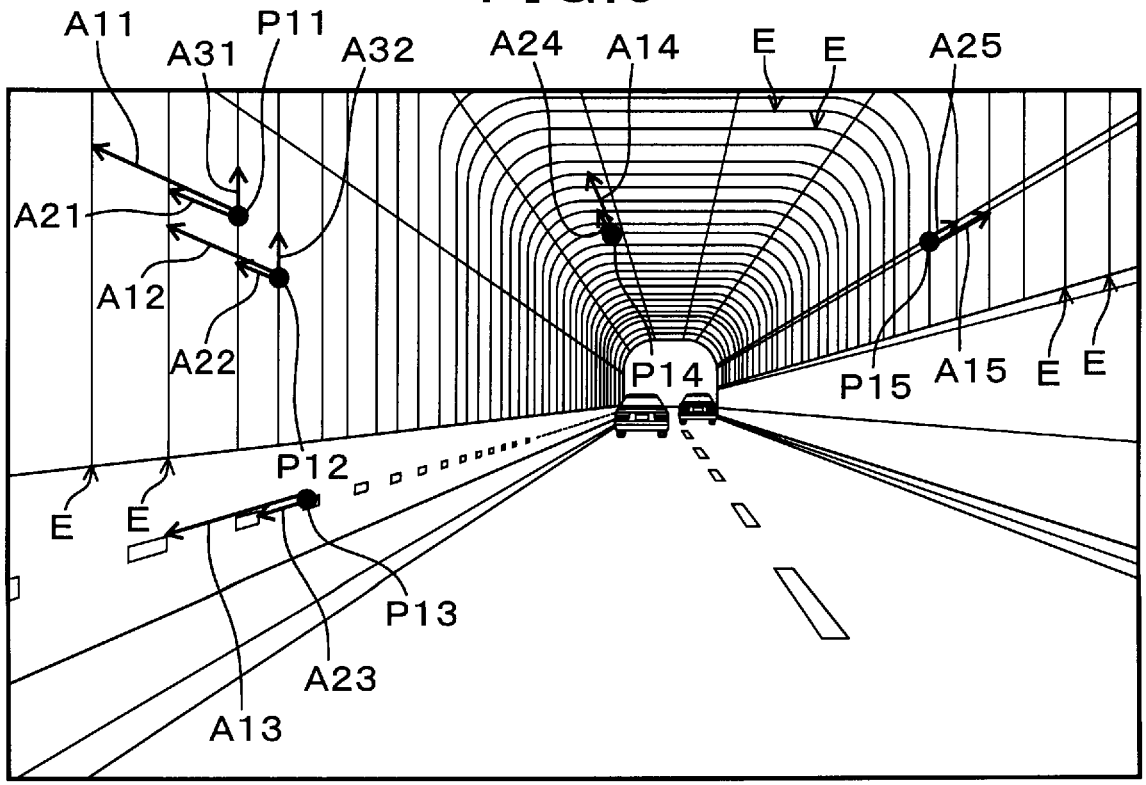
FIG. 5 is a diagram for explaining a mechanism of aliasing occurrence according to the first embodiment, and schematically illustrates an image captured at a predetermined time t12.

Here, as illustrated in FIGS. 4 and 5, the mechanism of aliasing will be described by taking as an example a case where a vehicle is traveling in a section in which soundproof walls having the same shape are continuously provided. FIG. 4 illustrates an image captured at a predetermined time t11, and FIG. 5 illustrates an image captured at a predetermined time t12, which is an image one frame after the image illustrated in FIG. 4. In this case, it is assumed that four feature points P11 to P15 are associated with each other for the images for two frames in FIGS. 4 and 5. The interval between the repeated patterns in this case is an interval between the wall edges of the soundproof walls. In FIGS. 4 and 5, some wall edges are denoted by a reference sign E.

Here, if the vehicle moves by two grids in one frame, a flow indicated by arrows A11 to A15 is a correct optical flow. However, if a flow indicated by arrows A21 to A25 is dominant due to an incorrect correspondence, there is a risk that an erroneous estimation may be made that the vehicle has advanced only by one grid in one frame, or that the feature points P11 to P15 are far from the actual points. In addition, if a flow indicated by arrows A31 and A32 is dominant due to an incorrect correspondence, there is a risk that an erroneous estimation may be made that the vehicle has sunk by one grid in one frame. Meanwhile, when an association that minimizes a vector is performed in the SFM recognizer 18, an incorrect correspondence starts when "grid width≈vehicle movement amount", and an influence increases as the movement amount increases.

Accordingly, in the present embodiment, the following refinement is added in order to suppress the occurrence of such erroneous estimation due to aliasing. That is, in this embodiment, the localizer 16 has a function as the information acquirer that acquires beforehand specific location information that is information representing a specific location. As described above, the specific location is a location where there is an object having an appearance in which the same pattern is repeated along the travel direction of the vehicle, such as a section in which soundproof walls having the same shape are continuously provided.

The specific location information includes information indicating whether the vehicle has passed through the specific location at that time, the position of the abovementioned pattern (for example, the position of the soundproof wall), and the abovementioned repetition interval of the pattern, that is, the interval of the repeated pattern (for example, the interval between the wall edges), and the like. The localizer 16 outputs data Df representing the specific location information to the ego-motion calculator 13. The SFM recognizer 18 estimates the own vehicle behavior based on the data Df representing the specific location information transmitted from the localizer 16 in addition to the data Db representing the image captured by the image sensor 3.

Specifically, the SFM recognizer 18 determines whether the vehicle has passed through the specific location based on the specific location information, that is, determines whether aliasing occurs. When determining that aliasing occurs, the SFM recognizer 18 sets an imaging cycle of the image sensor 3, that is, an operation cycle of the SFM per se so as to fulfill a condition of the following formula (1). Note that a movement amount of the vehicle between one frame of the image captured by the image sensor 3 is dx, and the repetition interval of the pattern is w.

$$w/2 > dx \tag{1}$$

That is, the SFM recognizer 18 sets the SFM cycle such that the movement amount dx of the vehicle is smaller than half the repetition interval of the pattern w, and, moreover, estimates the own vehicle behavior based on the data Db representing the image captured by the image sensor 3. In addition, the SFM recognizer 18 only needs to set the cycle described above when the condition of the above formula (1) is not fulfilled, and when the condition of the above formula (1) is already fulfilled, there is no need to perform the setting. By setting the SFM cycle in this way, the occurrence of erroneous estimation due to aliasing is suppressed.

In a general countermeasure against aliasing, due to that when an input signal having a frequency higher than half a sampling frequency is sampled, aliasing occurs, the sampling frequency is set so as not to fulfill such a condition. The countermeasure against the occurrence of erroneous estimation due to aliasing in the present embodiment described above is also based on the same principle as that of such a general countermeasure against aliasing.

The landmark detector 14 includes a recognizer 20 and a target generator 21. The recognizer 20 detects a position of a landmark on the image captured by the image sensor 3 based on the data Db. Note that various methods can be employed as a method for detecting the position of the landmark. The above landmark includes, for example, a sign, a signboard, a pole such as a utility pole or a streetlight, a white line, a traffic light, the wall edge described above, and the like.

The recognizer 20 recognizes a travel path or lane of the own vehicle based on the data Db, and acquires division line information that is information representing a road parameter and a division line. The road parameter includes information representing a lane shape, such as a lane width and a curvature of the lane, that is, a road. In addition, the road parameter includes information representing a traveling state of the vehicle relative to the lane shape, such as an offset representing a distance from a center position in a width direction of the lane to a position of the vehicle and an yaw angle representing an angle between the lane, that is, a tangential direction of the road and a travel direction of the own vehicle.

In this case, travel path information such as the division line information described above is also included in the landmark. The recognizer 20 outputs data Dg representing such a landmark detection result to the target generator 21. The target generator 21 collates the detected landmark with the SFM point in the detected landmark based on the data Dg supplied from the recognizer 20 and the data Dd supplied from the SFM recognizer 18, thereby obtaining physical position information including a landmark distance and a lateral position. The landmark detector 14 outputs data Dh representing the road parameter acquired by the recognizer 20 to the vehicle controller 4. In addition, the landmark detector 14 outputs to the map generator 15 data Di representing information on a position of the landmark including travel path information such as division line information generated by the target generator 21.

The map generator 15 generates map information based on the data Da representing GPS information, the data De supplied from the ego-motion calculator 13, and the data Di supplied from the landmark detector 14. Specifically, the map generator 15 links the GPS information, the generated landmarks, and the travel locus, thereby generating map information that is fragmentary map data. Hereinafter, the map information generated by the map generator 15 is also referred to as a probe map. Data Dj representing the probe map generated by the map generator 15 is uploaded to the server 2 as probe data and is output to the localizer 16.

The probe map has a limit in the accuracy of the SFM, and thus the accuracy is not sufficiently high. Accordingly, the integrator 10 of the server 2 superimposes and integrates a plurality of probe maps based on the data Dj transmitted from a vehicle-mounted device of each vehicle, thereby improving the accuracy of the map. When the integration by the integrator 10 is successful, the updater 11 of the server 2 updates the integrated map. The server 2 distributes data Dk representing the integrated map to the vehicle-mounted device of each vehicle. In this case, the server 2 identifies an approximate position of a distribution destination vehicle based on the GPS information and the like, and distributes an integrated map around the approximate position (for example, a radius of several kilometers around the approximate position). In addition, when a map exists on the vehicle-mounted device side, differential distribution of the map is also possible.

The localizer 16 performs localization for estimating the current position of the own vehicle. The localizer 16 downloads the data Dk representing the integrated map from the server 2, and performs localization on the integrated map based on the downloaded data Dk, the data Dj representing the probe map, and the data Db representing the image captured by the image sensor 3. In addition, the localizer 16 can also perform localization without using the data Dj representing the probe map.

The localizer 16 calculates the road parameter based on the map information when the localization is successful. The localizer 16 outputs data Dl representing a road parameter based on the map information to the vehicle controller 4. The vehicle controller 4 executes various processes for controlling the traveling of the own vehicle based on the data Dh supplied from the landmark detector 14 and the data Dl supplied from the localizer 16. That is, the vehicle controller 4 executes various processes for controlling the traveling of the own vehicle based on the road parameter.

In the above configuration, the map generator 15 has a function as a passage determiner that determines whether the vehicle has passed through the specific location and has a function as an information transmitter that transmits information related to the passed specific location (hereinafter also referred to as related information) to the server 2 isolated from the vehicle when determining that the vehicle has passed the above location. Each process executed by the map generator 15, that will be described later, corresponds to a passage determination procedure and an information transmission procedure.

In this case, the map generator 15 determines whether the vehicle travel locus represented by the data De and the landmark information represented by the data Di are physically impossible. Note that, as the travel locus that is physically impossible, for example, a locus that exhibits behavior exceeding a motion performance of the vehicle is assumed. In addition, as an example of landmark information that is physically impossible, for example, there may be a sign size that is so large or so small that it can not exist. If at least one of the travel locus and the landmark information is physically impossible, it is highly likely that the vehicle is passing through a location corresponding to the specific location, that is, aliasing has occurred.

Accordingly, when determining that at least one of the travel locus and the landmark information is physically impossible, the map generator 15 transmits the information related to the specific location where the vehicle has passed at that time to the server 2. In this case, the related information can be transmitted to the server 2 in a form included in the data Dj described above. The server 2 generates or updates the specific location information based on the related information represented by the data Dj transmitted from a plurality of vehicles.

The map generator 15 executes at all times such a process, that is, a process as the passage determiner and the information transmitter. Therefore, the map generator 15 executes the above-described each process even when the vehicle passes through a specific location corresponding to the specific location information already acquired by the localizer 16. In this way, the accuracy of the specific location information generated in the server 2 can be raised.

In addition, on the vehicle-mounted device side, since it is difficult to determine the specific location with high accuracy, if the server 2 generates the specific location information based on only the above mentioned related information, the accuracy may be lowered. Accordingly, the server 2 collects data such as a vehicle speed and a lane offset difference, and detects abnormal data that is inconsistent in the data. The server 2 checks the lane, the traveling lane, the own vehicle behavior estimated at that time, and the like for the abnormal data, and collates them with the integrated map created with normal data to determine the occurrence of aliasing.

In this way, the server 2 detects a location where aliasing occurs, that is, the specific location, and assigns specific location information, which is information about the specific location, to the data Dk representing the integrated map. As described above, the server 2 distributes data Dk to the vehicle-mounted device of each vehicle. The localizer 16 having a function as the information acquirer acquires the specific location information based on the data Dk distributed from the server 2 and outputs the data Df representing the acquired specific location information to the ego-motion calculator 13.

Based on the estimated current position of the own vehicle, the positional relationship between the current position and the recognized landmark, the vehicle speed of the own vehicle, the localizer 16 determines whether the vehicle has passed through the specific location at that time, that is, whether aliasing occurs. Therefore, the determination result may be included in the data Df transmitted to the ego-motion calculator 13. In this case, the data Dk transmitted from the server 2 may not include information indicating whether the vehicle has passed through the specific location. In addition, the abovementioned each process executed by the localizer 16 corresponds to the information acquisition procedure.

In the present embodiment, as described above, a refinement for suppressing the occurrence of erroneous estimation due to aliasing is added; however there may be a case where the occurrence of erroneous estimation due to aliasing cannot be avoided. In such a case, the ego-motion calculator 13 cannot estimate the own vehicle behavior. Then, there is a risk that a problem may arise in the process performed using the own vehicle behavior estimated by the ego-motion calculator 13.

Accordingly, the canceller 17 detects such an abnormality, that is, the occurrence of an abnormality that makes it impossible for the ego-motion calculator 13 to estimate the own vehicle behavior. For example, it is determined that the abnormality occurs when the vehicle is currently passing through a location corresponding to the specific location and information about the specific location (for example, the repetition interval of the pattern) is insufficient. In addition, depending on the vehicle speed and the repetition interval of the pattern, it may be difficult to change the SFM cycle so as to fulfill the above formula (1); however, even in such a case, it can be determined that the above abnormality occurs. Moreover, the abovementioned each process executed by the canceller 17 and each process described later correspond to a cancellation procedure.

When the occurrence of the abnormality is detected, the canceller 17 cancels or changes the execution of a process related to the vehicle, that is performed using directly or indirectly the own vehicle behavior estimated by the ego-motion calculator 13. As a result, a process of each functional block is stopped or changed as follows. That is, in this case, the SFM recognizer 18 is reset. Note that "reset" as used herein means that the SFM recognizer 18 discards all the information on the feature points acquired up to that point, and starts acquiring information on the feature points from the beginning.

In addition, in this case, since the correct data Dd is not transmitted from the SFM recognizer 18, the travel locus generator 19 uses information other than the data Dd and interpolates data based on the vehicle speed, yaw rate, GPS information, and the like on the vehicle, for example. By doing so, travel locus estimation with relatively low accuracy is performed. Moreover, in this case, since the distance cannot be estimated correctly while the SFM recognizer 18 is not operating or the SFM recognizer 18 is reset, the target generator 21 outputs all targets in an invalid state so that they are not used in a post-process.

Alternatively, in this case, the target generator 21 executes a process by switching to a simple distance estimation logic that does not use the SFM or optical flow. As the simple distance estimation logic, various methods such as a method for estimating a distance based on the pinhole principle and a method for estimating a distance by assuming a landmark can be employed. However, the target generator 21 outputs in an invalid state those that cannot be estimated by the simple distance estimation logic (for example, a pole or the like).

In addition, in this case, the map generator 15 prevents the probe data from being uploaded by setting an output to an invalid value or uploads only an invalidity flag. Consequently, the integrator 10 of the server 2 excludes the probe data to which the invalidity flag is assigned from integration targets. Further, in this case, since the travel locus and landmark information are obtained by the above-described simple distance estimation logic, the localizer 16 performs the localization process within a range that is possible by using the travel locus and landmark information.

However, in this case, there is a high possibility that the localization accuracy is degraded. For this reason, the localizer 16 assigns to the data Dl output to the vehicle controller 4 accuracy degradation information indicating that the localization accuracy is degraded. Consequently, the vehicle controller 4 executes various controls on the premise of the accuracy degradation when the data Dl to which the accuracy degradation information is assigned is transmitted. For example, in this case, the vehicle controller 4 executes a control with a control amount weakened, or stops the execution of a control that requires high accuracy.

As described above, the control device 8 of the present embodiment functions as an apparatus for estimating an own vehicle behavior based on the image captured by the image sensor 3 that captures a periphery of the vehicle. In addition, the ego-motion calculator 13 included in the control device 8 estimates the own vehicle behavior based on the specific location information acquired beforehand by the localizer 16 in addition to the image captured by the image sensor 3. According to such a configuration, when the vehicle is traveling in the specific location where the estimation of the own vehicle behavior based on the image becomes unstable, the ego-motion calculator 13 can supplement the estimation of the own vehicle behavior in the image based on the specific location information. Therefore, according to the abovementioned configuration, an excellent effect that the own vehicle behavior can be estimated accurately even in a location where the estimation of ego-motion in an image becomes unstable.

In this case, as the specific location, a location where there is an object having an appearance in which the same pattern is repeated along the travel direction of the vehicle, such as a section in which soundproof walls having the same shape are continuously provided, is assumed. In addition, the ego-motion calculator 13 is configured to estimate the own vehicle behavior using the SFM method. For this reason, when the vehicle travels in the section as described above, aliasing occurs, and there is a risk that an error may occur in the estimation of the own vehicle behavior by the SFM recognizer 18 of the ego-motion calculator 13, that is, erroneous estimation due to aliasing may occur.

Accordingly, in the present embodiment, the specific location information includes the position of the pattern and the repetition interval of the pattern. In addition, the SFM recognizer 18 sets the SFM cycle such that a movement amount of the vehicle per inter-frame interval of the captured images captured by the image sensor 3 is smaller than half the repetition interval of the pattern, and, moreover, estimates the own vehicle behavior based on the image captured by the image sensor 3. In this way, it is possible to suppress the occurrence of erroneous estimation due to aliasing only by executing the process for changing the SFM cycle without changing the process content for estimating the own vehicle behavior.

The control device 8 includes the canceller 17 that cancels or changes the execution of a predetermined process related to the vehicle, that is performed using directly or indirectly the own vehicle behavior estimated by the ego-motion calculator 13 when the occurrence of an abnormality that makes it impossible for the ego-motion calculator 13 to estimate the own vehicle behavior is detected. According to such a configuration, even when the occurrence of erroneous estimation due to aliasing cannot be avoided, the above process is not executed as it is using the erroneously estimated own vehicle behavior. Therefore, according to the above configuration, it is possible to prevent problems in various processes performed using the own vehicle behavior, such as a malfunction of the vehicle controller 4, a decrease in accuracy of a probe map generated by the map generator 15, and thus a decrease in accuracy of the integrated map generated in the server 2, and a decrease in the localization accuracy by the localizer 16.

In the above configuration, the map generator 15 has a function for determining whether the vehicle has passed through the specific location and transmitting the information related to the passed specific location to the server 2 when determining that the vehicle has passed the above location.

The server 2 generates the specific location information based on the information related to the passed specific location transmitted from a plurality of vehicles. According to such a configuration, the accuracy of the specific location information generated in the server 2 can be raised.

Second Embodiment

Hereinafter, a second embodiment will be described with reference to FIGS. 6 and 7.

In the present embodiment, the content of the process executed by the ego-motion calculator 13, more specifically, the content of the process executed by the SFM recognizer 18 for suppressing the occurrence of erroneous estimation due to aliasing is different from the first embodiment. When determining that aliasing occurs, the SFM recognizer 18 of the present embodiment predicts a change in the position of the pattern on the image captured by the image sensor 3 based on the position of the pattern and the repetition interval of the pattern, and estimates the own vehicle behavior using the prediction result.

Hereinafter, the specific content of a process for suppressing the occurrence of erroneous estimation due to aliasing in the present embodiment will be described with reference to FIGS. 6 and 7. Here, as illustrated in FIGS. 4 and 5, it is assumed that the vehicle is traveling in a section in which soundproof walls having the same shape are continuously provided, and the process content for suppressing the occurrence of erroneous estimation will be described using the association of a feature point P12 as an example.

Figure 6:
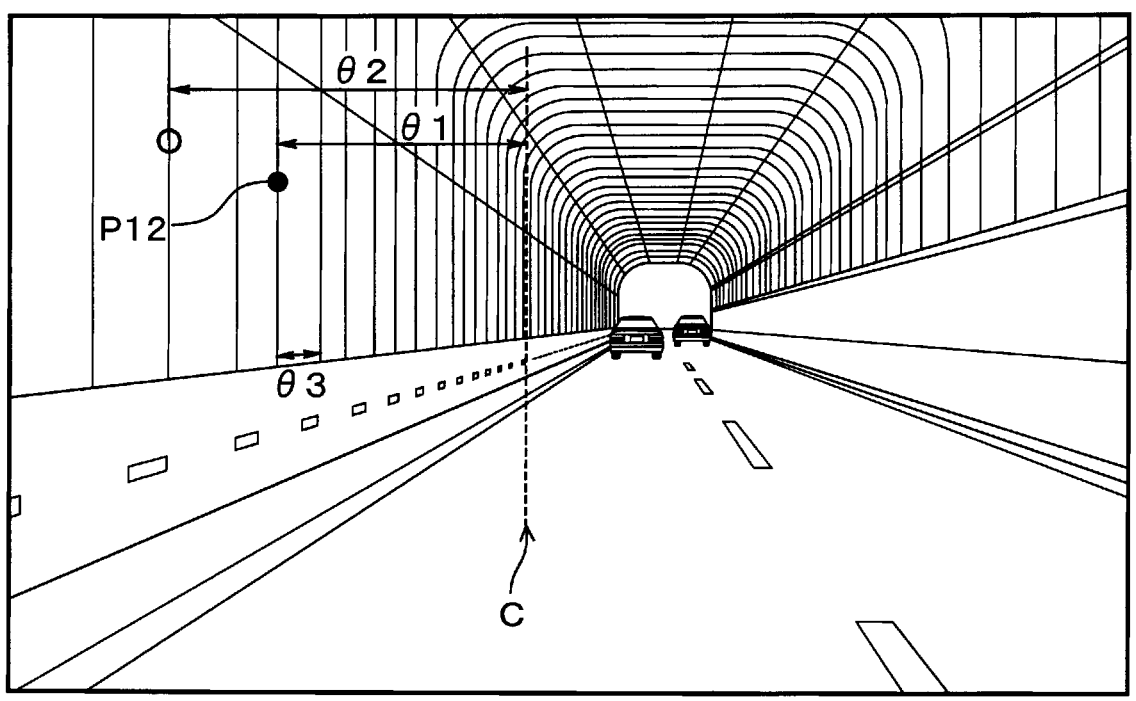
FIG. 6 is a diagram for explaining a process for suppressing occurrence of erroneous estimation due to aliasing according to a second embodiment, and schematically illustrates an image captured at a predetermined time t11.
Figure 7:
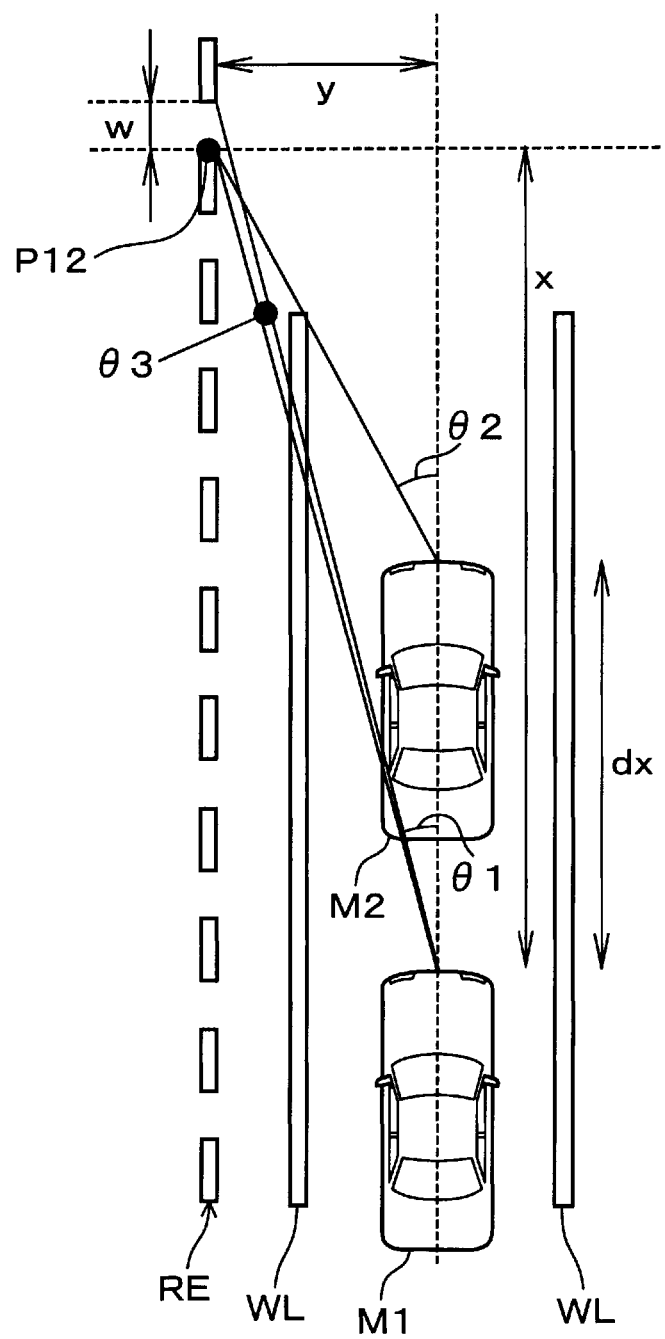
FIG. 7 is a diagram schematically illustrating a plan view of the image of FIG. 6 as viewed from above a vehicle.

In addition, FIG. 6 illustrates an image taken at a predetermined time t11 as is the case with FIG. 4. Moreover, in FIG. 6, a position of the feature point P12 on the image one frame after is indicated by a white circle mark, and a dotted line indicating a center position of the own vehicle is denoted by a reference sign C. Furthermore, in FIG. 7, a position of the vehicle on the image captured at time t11 is M1, a position of the vehicle on the image one frame after that is M2, a white line is WL, and a road edge is RE.

A repeated pattern width θ3 can be calculated from image coordinates that are coordinates on the image. In addition, a repetition pattern interval w is an interval between the wall edges and corresponds to the repetition interval of the pattern. That is, since being included in the specific location information, the repetition pattern interval w can be acquired beforehand. Furthermore, a lateral position y from the center of the vehicle to the road edge RE can be obtained from the map information and localization, or from the detection result of the road edge RE.

Assuming that the vehicle is traveling in parallel with the road edge RE and a white line WL, a distance x along the travel direction of the vehicle up to the feature point P12 at time t11 can be calculated using the repeated pattern width θ3, the horizontal position y, and the repetition pattern interval w, which are known values as described above. In addition, an azimuth angle θ1 of the feature point P12 viewed from the vehicle at time t11 can be calculated from the image coordinates. Furthermore, the movement amount dx of the vehicle per inter-frame interval of the captured images can be calculated using the detected value of the vehicle speed.

An azimuth angle θ2 of the feature point P12 after one frame can be calculated using the azimuth angle θ1, the movement amount dx, the distance x, and the lateral position y, which are known values as described above. In this way, if the position and interval of the repetitive pattern are clear, it is possible to predict the position of the feature point on the image after one frame, and the incorrect correspondence can be prevented by using the prediction result. In addition, the position and interval of the repetitive pattern described above are included in the specific location information acquired beforehand by the localizer 16.

The SFM recognizer 18 can determine whether each optical flow calculated based on the images for two frames is correct, based on the position of the feature point on the image after one frame predicted by the above-described method. In this way, the SFM recognizer 18 can exclude an optical flow determined to be incorrect as the result of the determination of being correct or incorrect and can estimate the own vehicle behavior using only an optical flow determined to be correct. Alternatively, the SFM recognizer 18 can estimate the own vehicle behavior after correcting the optical flow that is determined to be incorrect so to be a correct flow. Thus, the occurrence of erroneous estimation due to aliasing is suppressed.

As described above, also according to the present embodiment, the ego-motion calculator 13 can supplement the estimation of an own vehicle behavior in an image based on the specific location information. Therefore, also according to the present embodiment, as is the case with the first embodiment, an excellent effect can be obtained that the own vehicle behavior can be estimated accurately even in a location where the estimation of ego-motion in the image becomes unstable. Furthermore, according to the present embodiment, the following effects can also be obtained.

That is, in the present embodiment, since it is not necessary to change the SFM cycle as in the first embodiment, the occurrence of erroneous estimation due to aliasing can be suppressed regardless of the vehicle speed and the value of the repetition interval of the pattern. Therefore, according to the present embodiment, compared with the first embodiment, it is possible to reduce the occurrence frequency of an abnormality that makes it impossible for the ego-motion calculator 13 to estimate the own vehicle behavior. In addition, since the technique of the first embodiment suppresses the occurrence of erroneous estimation due to aliasing by changing the SFM cycle, it is impossible to deal with a case in which it is incorrectly estimated that the vehicle has sunk in one frame. However, according to the technique of the present embodiment, it is possible to suppress the occurrence of erroneous estimation even in such a case.

Modifications

In addition, the present disclosure is not limited to each embodiment described above and described in the drawings, and any modification, combination, or expansion can be made without departing from the scope of the disclosure.

The numerical values and the like illustrated in the above embodiments are examples and are not limited thereto.

In the map system 1, each functional block may be distributed. For example, a part of each functional block included in the control device 8 on the vehicle side, that is, the vehicle-mounted device side may be provided in the control device 9 on the server 2 side, and each control device may execute the estimation of the own vehicle behavior by transmitting and receiving various data via communication.

In the first embodiment, while the SFM recognizer 18 changes the SFM cycle so as to fulfill the condition of the above-described formula (1), as an alternative to or in addition to this, the vehicle speed may be changed so as to fulfill the condition of the formula (1). Even in this case, the action and effect similar to the case where the SFM cycle is changed can be obtained.

Although the present disclosure has been described with reference to the embodiments, it is understood that the present disclosure is not limited to the aforementioned embodiments and configurations. The present disclosure includes various variations and modifications within the equivalent range. In addition, various combinations and forms, as well as other combinations and forms further including only one element, or more or less than that, are within the scope and spirit of the present disclosure.

What is claimed is:

1. An apparatus for estimating an own vehicle behavior that is a behavior of a vehicle carrying the apparatus based on images of surroundings of the vehicle captured by an imaging device mounted to the vehicle, the apparatus comprising:

an information acquirer that acquires beforehand specific location information that is information representing a specific location in which a situation around the vehicle is such that the estimation of the own vehicle behavior based on the images is unstable; and a behavior estimator that estimates the own vehicle behavior based on the images captured by the imaging device and the specific location information, wherein the behavior estimator estimates the own vehicle behavior using a method of Structure From Motion, the specific location is a location where there is an object having an appearance in which a same pattern is repeated along a travel direction of the vehicle, and the specific location information includes a position of the same pattern and a repetition interval of the same pattern.

2. The apparatus according to claim 1, wherein the behavior estimator sets a cycle of the Structure From Motion such that a movement amount of the vehicle per inter-frame interval of the captured images is smaller than half the repetition interval of the same pattern, and estimates the own vehicle behavior.

3. The apparatus according to claim 1, wherein the behavior estimator predicts a change in the position of the same pattern on the captured images based on the position of the same pattern and the repetition interval of the same pattern, and estimates the own vehicle behavior using a prediction result.

4. The apparatus according to claim 1, further comprising a canceller that cancels or changes execution of a predetermined process related to the vehicle, which is performed using the own vehicle behavior estimated by the behavior estimator, directly or indirectly when an occurrence of an abnormality in which the own vehicle behavior cannot be estimated by the behavior estimator is detected.

5. The apparatus according to claim 1, further comprising:

a passage determiner that determines whether the vehicle has passed the specific location; and an information transmitter that transmits, to a server isolated from the vehicle, information related to the specific location that has been passed when the passage determiner determines that the vehicle has passed the specific location, wherein the server generates or updates the specific location information based on the information related to the specific location that has been passed transmitted from the information transmitter of a respective one of a plurality of vehicles, and the information acquirer acquires the specific location information from the server.

6. A method for estimating a behavior of a vehicle based on images of surroundings of the vehicle captured by an imaging device mounted to the vehicle, the method comprising:

acquiring beforehand specific location information that is information representing a specific location in which a situation around the vehicle is such that the estimation of the own vehicle behavior based on the images is unstable; and estimating the own vehicle behavior that is the behavior of the vehicle based on the images captured by the imaging device and the specific location information, wherein the own vehicle behavior is estimated using a method of Structure From Motion, the specific location is a location where there is an object having an appearance in which a same pattern is repeated along a travel direction of the vehicle, and the specific location information includes a position of the same pattern and a repetition interval of the same pattern.

7. A non-transitory computer-readable medium storing a computer program, which when executed by a computer executes a method for estimating a behavior of a vehicle based on images of surroundings of the vehicle captured by an imaging device mounted to the vehicle, the method comprising:

acquiring beforehand specific location information that is information representing a specific location in which a situation around the vehicle is such that the estimation of the own vehicle behavior based on the images is unstable; and estimating the own vehicle behavior that is the behavior of the vehicle based on the images captured by the imaging device and the specific location information, wherein the own vehicle behavior is estimated using a method of Structure From Motion, the specific location is a location where there is an object having an appearance in which a same pattern is repeated along a travel direction of the vehicle, and the specific location information includes a position of the same pattern and a repetition interval of the same pattern.

8. An apparatus for estimating an own vehicle behavior that is a behavior of a vehicle carrying the apparatus based on images of surroundings of the vehicle captured by an imaging device mounted to the vehicle, the apparatus comprising:

a storage device storing a computer program; and a control device that reads and executes the computer program from the storage device, wherein the computer program, when executed, enables the control device to:

acquire beforehand specific location information that is information representing a specific location in which a situation around the vehicle is such that the estimation of the own vehicle behavior based on the images is unstable, and estimate the own vehicle behavior based on the images captured by the imaging device and the specific location information, wherein the own vehicle behavior is estimated using a method of Structure From Motion, the specific location is a location where there is an object having an appearance in which a same pattern is repeated along a travel direction of the vehicle, and the specific location information includes a position of the same pattern and a repetition interval of the same pattern.

\* \* \* \* \*